United States Patent [19]

Allen

[11] 4,134,212

[45] Jan. 16, 1979

[54] GROWTH MEASURING SCALE

[76] Inventor: Cloy L. Allen, P. O. Box 224, Wingate, Tex. 79566

[21] Appl. No.: 847,632

[22] Filed: Nov. 1, 1977

Related U.S. Application Data

[63] Continuation-in-part of Ser. No. 767,592, Feb. 10, 1977, abandoned.

[51] Int. Cl.² .......................... G01B 5/02; G01B 3/20
[52] U.S. Cl. ................................................ 33/169 R
[58] Field of Search .......................... 33/169 R, 174 D

[56]     References Cited
U.S. PATENT DOCUMENTS

| 442,192 | 12/1890 | Lewis | 33/169 R |
|---|---|---|---|
| 1,996,553 | 4/1935 | Scully | 33/169 R |
| 2,215,884 | 9/1940 | Runge | 33/169R |
| 2,324,334 | 7/1943 | Sutton | 33/169 R |
| 2,736,100 | 2/1956 | Landau | 33/169 R |
| 4,008,524 | 2/1977 | Allen | 33/169 R |

Primary Examiner—Richard R. Stearns
Attorney, Agent, or Firm—Robert K. Rhea

[57]     ABSTRACT

An elongated panel, adapted to be flatly secured vertically to a wall surface, is provided with lateral flanges which slidably engage a vertically movable head. The head is provided with a pivotally connected head bar movable from a head locked idle position to a horizontal position indicating height by indicia on the panel when the head bar is disposed above the head of the person whose height is being measured. A plurality of markers, such as stickers or pins, are provided for individual adhesion or attachment at a selected one of a plurality of locations printed or scored on the panel in vertically spaced horizontal rows aligned with scale forming indicia on the panel to form a record of the height attained by individuals, as shown by the position of the head bar.

5 Claims, 7 Drawing Figures

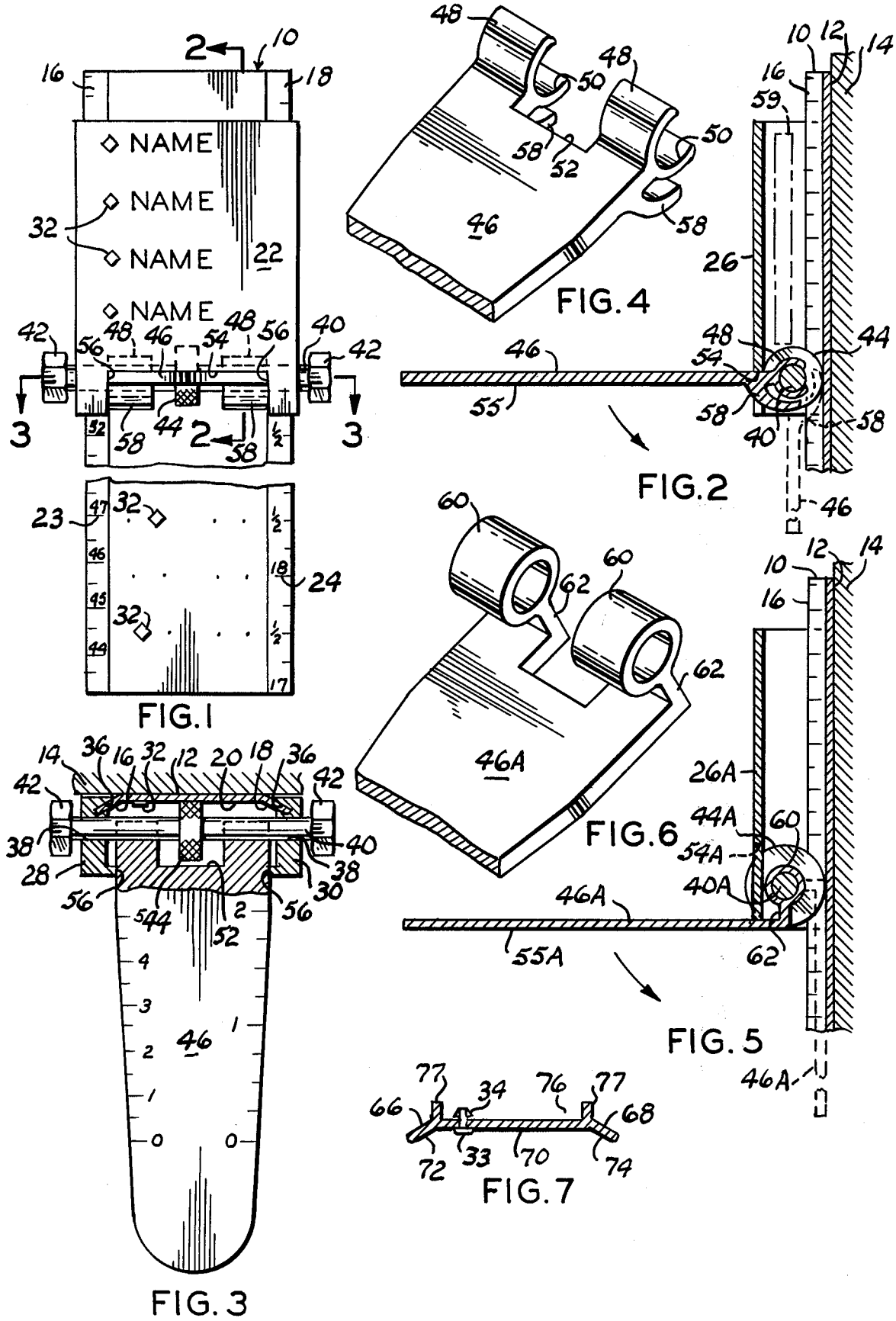

GROWTH MEASURING SCALE

CROSS REFERENCE TO RELATED APPLICATION

This invention is a continuation-in-part of an application filed by me in the United States Patent and Trademark Office on Feb. 10, 1977, under Ser. No. 767,592 for GROWTH MEASURING SCALE, now abandoned.

BACKGROUND OF THE INVENTION

1. Field of the Invention.

The present invention relates to measuring scales of the type to be attached to a vertical wall surface for measuring and recording the height and growth rate of individuals.

Some families make a practice of maintaining a family record or growth rate of the height of children by marking, such heights, as well as the weight and date on some portion of a vertical wall in the home, however, due to changing conditions, such as moving from one residence to another or redecorating, the growth record is lost or destroyed.

This invention provides a measuring device by which a family can record the height and/or growth rate of younger members of the family which forms a permanent record and may be moved from one location to another.

2. Description of the Prior Art.

The most pertinent prior patent is believed to be my U.S. Pat. No. 4,008,524 which discloses a head member slidable on a vertical scale member with the head member being moved by manual rotation of the shaft having pinions thereof engageable with a rack forming a part of the scale member.

Other prior art, such as U.S. Pat. Nos. 1,996,553 and 2,215,884, generally disclose elongated wall connected scale members in which the head level measuring member is secured to the scale member in an encircling fashion, such as disclosed by U.S. Pat. No. 1,996,553 or in which the head member is secured to the scale member by entering oppositely disposed grooves formed therein, as disclosed by U.S. Pat. No. 1,996,553.

This invention is distinctive over my above named patent and other prior growth rate measuring devices by providing a simplified version of a wall mounted scale equipped measuring apparatus comprising an elongated panel and a normally friction locked vertical head member slidably engaging the panel for measuring an individual's height and further including a plurality of adhesive stickers or pins to be individually attached to an intermediate portion of the panel in accordance with growth rates recorded. Additionally, in its preferred embodiment, the sliding head supports a record book for recording other data of the persons measured.

SUMMARY OF THE INVENTION

An elongated flanged edge base member, or panel, is adapted to be vertically secured to a wall surface. The flanged edges vertically slidably support a head member. Scale indicia is scored on or attached to the panel flanges. A head bar, pivotally connected with the depending end of the head member, is manually movable to a horizontal position for contacting the top of the head of a person being measured and determining the height of that person by the horizontal position of the head bar with respect to the indicia. A plurality of register pins or adhesive dots are separably identifiable, as by colors, with respective members of a family for insertion into or attachment at a selected location coinciding with the dimension lines of the indicia thus forming a record of the respective individual's height at a given date. Identifying names and corresponding pins (or dots) form a part of the head member for subsequent measurement and pin placement of a growing individual. A record book for recording other data, such as the data and weight, is removably supported within a recess formed in the head member.

The principal object of this invention is to provide a height and growth rate record for each member of a family which is simple and economical in construction, easy to assemble and is removably mounted on a vertical wall surface. A further object is to provide juxtaposed inch and metric scales for training children in the use of the metric system of measurement.

BRIEF DESCRIPTION OF THE DRAWINGS

FIG. 1 is a fragmentary elevational view of a preferred embodiment of the device in operative position;

FIG. 2 is a fragmentary vertical cross sectional view taken substantially along the line 2—2 of FIG. 1 illustrating, by dotted lines, the manner in which the pivoting head bar, when not in use, locks the vertically sliding head to the base panel and illustrating, by phantom lines, a record book supported by the head;

FIG. 3 is a horizontal sectional view, partially in elevation, taken substantially along the line 3—3 of FIG. 1;

FIG. 4 is a fragmentary perspective view, to a larger scale, of the head connected end of the head bar;

FIG. 5 is a view similar to FIG. 2 illustrating an alternative embodiment of the head bar connected end and head moving friction wheel;

FIG. 6 is a view similar to FIG. 4 illustrating the head connected end portion of the head bar shown by FIG. 6; and, FIG. 7 is a transverse sectional view of an alternative embodiment of the wall connected scale.

DESCRIPTION OF THE PREFERRED EMBODIMENTS

Like characters of reference designate like parts in those figures of the drawings in which they occur.

In the drawings:

The reference numeral 10 indicates an elongated substantially rectangular base panel of uniform transverse section having its rearward surface 12 flatly contacting and secured to the surface of a vertical wall, indicated at 14 (FIGS. 2 and 3). The panel 10 is preferably formed from lightweight material which may be flexible and is secured, as by nailing it to the wall or by adhesive material, not shown. The panel 10 is characterized by a pair of coextensive flange edge portions 16 and 18 projecting forwardly of its forward surface 20 in diverging relation at its respective longitudinal side edge. The purpose of the flanges 16 and 18 is for slidable engagement with a portion of a vertically movable head member 22 in the manner presently explained.

The generally forwardly disposed surface of the flanges 16 and 18 are printed or scored with indicia 23 and 24 indicating units of measurement, for example, the scale 23 may comprise a metric scale such as centimeters and meters while the scale 24 may comprise feet and inches so that young persons using the apparatus may learn the equivalents of one scale with respect to the other. The head member 22 is preferably similarly formed from lightweight material and is open end rectangular box-like in general configuration having a normally forwardly disposed vertical front wall 26 integrally joined to opposing side walls 28 and 30. The forward surface of the front wall 26 is provided with name spaces, each having a identifying colored sticker 32 or pin 33 at one end thereof. The pins 33 are preferably provided with shank barbs or lugs 34 (FIG. 7), to prevent its removal from within an aperture. A separate colored sticker or pin is assigned to each individual of the family.

The inwardly disposed surface of the respective head side wall 28 and 30 is provided with a longitudinally extending slot 36 formed on an angle complemental with the angle of the respective flange 16 and 18 for the purpose of slidably receiving the flanges therein and slidably supporting the head member 22 for vertical movement along the panel 10.

The depending end portion of each side wall 28 and 30 is provided with a transverse aperture or bore 38 for rejournalling an axle 40 projecting laterally from the respective wall and connected with a hexagonal nut 42 at each end.

A friction wheel 44 is coaxially connected with the axle 40 medially its ends. The friction wheel 44 is provided with a serrated periphery so that when the head 22 is mounted on the panel 10 manual rotation of either of the nuts 42 rotates the axle 40 about its longitudinal axis and slidably moves the head member 22 either up or down with respect to the panel 10 by the friction wheel contacting the outwardly disposed surface of the panel.

A generally rectangular head bar 46 is pivotally connected with the axle 40 for vertical movement about the horizontal axis of the axle. One end of the head bar 46 is provided with a pair of transversely aligned substantially Y-shaped arcuate resilient members 48, each defining a part-circular recess 5 surrounding an arc of at least 190° of longitudinally spaced portions of the axle 40 on opposing sides of the friction wheel 44. The head bar is provided with a central aperture 52 between the Y-members 48 to accommodate the friction wheel 44. The depending edge portion of the forward wall 26 of the head member is provided with a central downward open recess 54 defined by opposing upwardly converging walls 56 for accommodating the friction wheel 44 and receiving the opposing side surfaces of the head bar 46 in a wedging action therebetween and horizontally supporting the head bar. The position of the axle 40 and upper limit of the head bar slot 54 is related to the dimensions of the head bar 46 so that when the head bar is horizontally disposed its upper surface contacts the upper limit of the head bar slot 54. Adjacent its axle connected end, the depending surface 55 of the head bar 46 is provided with a pair of arcuate lugs 58 projecting toward the panel 10 when the head bar is horizontally disposed. The purpose of the lugs 58 is to form a wedging action between the forward surface of the panel 10 and the axle 40 when the head bar 46 is lowered to its dotted line position of FIG. 2, thus cooperating with the friction wheel 44 and maintaining the head member 26 at a selected friction locked position intermediate the height of the panel 10.

The head member 22 preferably contains a record book 59 for recording other data of the individuals being measured as a permanent written record.

Referring more particularly to FIG. 5, an alternative embodiment of the head member and head bar are illustrated. In this embodiment the axle 40A is similarly connected with the head member side walls and the hex nuts 42 are omitted. The friction wheel 44A is preferably diametrically dimensioned so that, in addition to frictionally contacting the forwardly disposed face of the panel 10, a peripheral portion thereof projects forwardly from the forward surface of the head member front wall 26A through the downwardly open slot 54A similarly formed in the depending end of the head member forward wall 26A for access to and manually rotating the friction wheel. The head bar 46A is provided at one end with a pair of laterally spaced cylindrical sleeves 60 axially surrounding respective end portions of the axle 40A between the side walls of the head member. The sleeves 60 are each connected with the head bar 46A by short leg members 62 integrally connected in right angular relation with the head bar so that the upper surface of the head bar, when horizontally disposed, contacts the depending edge surface of the head member forward wall 26A. The spacing between the longitudinal axis of the axle 40A and plane of the depending surface 55A of the head bar 46A is slightly greater than the radius of the friction wheel 44A so that, when the head bar 46A is pivoted t its dotted line position of FIG. 5, it similarly forms a friction lock of the head member by bearing against the panel 10 thus preventing relative movement between the head member and panel until the head bar is pivoted away from the panel.

FIG. 7 illustrates an alternative cross sectional configuration for the panel 10 formed from suitable, preferably flexible material, capable of being rolled for shipping or storage and characterized by opposing longitudinal side members 66 and 68 converging toward and joined to a web portion 70 to define generally forwardly disposed longitudinal edge surfaces 72 and 74 for receiving scale indicia, such as the scales 23 and 24. A rearwardly open recess 76 is defined by the web and opposing longitudinal legs 77 for receiving elongated, rectangular in cross section, filler panel or pad, not shown, to be supplied by the user of the apparatus and interposed between the web 70 and the wall-like legs 77 when the assembly is attached to the wall 14.

OPERATION

In the operation of the embodiment shown by FIGS. 1 through 4, when using the head member 22, the panel 10 is mounted on the wall so that its depending end is spaced a predetermined distance from the common supporting surface, such as the floor, not shown. This distance is determined by lowering the panel 10, with respect to the floor, a distance equal to the spacing between the depending surface 55 of the head bar 46, when horizontally disposed, and the depending edge surface of the head member wall 26. This adjusts the scale indicia on the panel so that the height of the individual being measured by the head bar surface 55 is readily observable by the position of the depending edge of the head member wall 26. Assuming the head member 22 is slidably mounted on the panel 10 and the head bar 46 is in its dotted line head member locked position, the head bar 46 is rotated to its solid line position to release the head member. The head member 26 must then be manually supported, such as by moving it vertically along the panel and/or by grasping one of the nuts 42 to rotate the axle and move the head bar depending surface 55 into contact with the individual's head being measured. When the height of the individual has been determined on one of the scales, one of the markers 32, assigned to the individual, is then bonded to the forward surface of the panel 10. The height, weight and date or other data is also recorded on the record book 59.

The operation of the embodiment illustrated by FIGS. 5 and 6, is substantially identical to that described hereinabove, except that the panel 10 is mounted on the wall 14 in accordance with the dimensions of the scales 23 and 24 and the depending limit of the head member wall 26A coincides with the depending surface 55A of the head bar 46A so that the height of the individual being measured is readily determined visually. In this embodiment, in addition to manual movement of the head member along the panel, the finger or thumb of the operator may contact the friction wheel 44A for discrete movements of the head member.

The upper surface of the respective head bar is provided, adjacent its respective lateral edge, with similar scales for use in measuring the distance representing a years growth or any portion thereof.

Obviously the invention is susceptible to changes or alterations without defeating its practicability. Therefore, I do not wish to be confined to the preferred embodiment shown in the drawings and described herein.

I claim:

1. A growth measuring apparatus, comprising:
    an elongated panel having scale indicia extending longitudinally along one marginal edge and having a back surface adapted to be vertically secured to a wall,
        said panel having lateral coextensive flanges extending outwardly in diverging relation from said back surface;
    a box-like head member having a vertical front wall transversely spanning the panel and integral with opposing side walls and having a coextensive longitudinal recess formed on the inner surface of each side wall for cooperative reception of said panel flanges in sliding relation;
    an axle horizontally journalled at the lower end portion of said head member in said side walls;
    friction means including a friction wheel axially connected with said axle intermediate its ends for frictionally engaging and moving said head member with respect to said panel; and,
    a head bar having means at one end portion at least partially surrounding said axle on opposing sides of said friction wheel for horizontally orienting said bar in one position and frictionally locking said head member against movement relative to said panel when said head bar is in another position.

2. The apparatus according to claim 1 in which said head member front wall is provided with a central downwardly open recess for engaging said head bar when in said one position and said head bar means includes:
    spaced-apart Y-shaped members formed on said one end of said head bar for forming a recess surrounding an arc of at least 190° of intermediate portions of said axle; and,
    an arcuate lug secured to said head bar adjacent each respective Y-shaped member and projecting toward and frictionally engaging said panel when said head bar is in said another position.

3. The apparatus according to claim 2 in which said axle projects beyond each respective said side wall and further including:
    a nut connected with each respective end of said axle.

4. The apparatus according to claim 1 in which said head bar means includes:
    a sleeve surrounding said axle on opposing sides of said friction wheel; and,
    a leg connected at one end with a peripheral portion of each said sleeve and connected at its other end in right angular relation with said one end of said head bar,
        the length of each said leg being at least slightly greater than the radius of said friction wheel for frictionally engaging the adjacent surface of said panel when said head bar is in said another position.

5. The apparatus according to claim 4 in which the lower end portion of said head member front wall is provided with a slot and a peripheral portion of said friction wheel projects forwardly through the slot.

* * * * *